United States Patent [19]
Whitby et al.

[11] Patent Number: 5,846,437
[45] Date of Patent: Dec. 8, 1998

[54] INCREASING TURBULENT MIXING IN A UV SYSTEM

[75] Inventors: G. Elliott Whitby, Toronto; Mark Richard Loewen, Oakville; Pierluigi Cozzi, Ridgeville, all of Canada

[73] Assignee: Trojan Technologies Inc., Canada

[21] Appl. No.: 778,913

[22] Filed: Jan. 3, 1997

[51] Int. Cl.$^6$ .................................................. C02F 1/32
[52] U.S. Cl. .................. 210/748; 422/24; 422/186.3; 250/432 R; 250/436; 250/438
[58] Field of Search .................. 210/748; 422/24, 422/186.3; 250/436, 437, 438, 432 R

[56] References Cited

U.S. PATENT DOCUMENTS

| | | | |
|---|---|---|---|
| 4,400,270 | 8/1983 | Hillman | 210/748 |
| 4,857,204 | 8/1989 | Joklik | 210/695 |
| 5,019,256 | 5/1991 | Ifill et al. | 210/232 |
| 5,352,359 | 10/1994 | Nagai et al. | 210/748 |

*Primary Examiner*—Neil McCarthy
*Attorney, Agent, or Firm*—Fitzpatrick, Cella, Harper & Scinto

[57] ABSTRACT

Turbulent mixing in a UV system is increased by positioning one or more ring-shaped devices, such as washers, at one or more predetermined locations on the exterior surface of each lamp unit in the system. The washers may have the same or different diameters. Turbulent mixing is also increased by retaining the upstream end of each lamp unit in a ring-shaped device, alone or in combination with washers positioned on each lamp unit exterior surface as described above.

16 Claims, 5 Drawing Sheets

INCREASING TURBULENT MIXING IN A UV SYSTEM

FIELD OF THE INVENTION

This invention relates to systems that use ultraviolet (UV) light to control organisms and more particularly to the dosage of UV radiation that the organism is subjected to in passing through the system.

DESCRIPTION OF THE PRIOR ART

As is well known, UV light may be used to disinfect water including wastewater. The UV light inhibits the replication of any pathogenic microorganisms in the water or wastewater. Recently, UV light has been proposed for controlling zebra and related mussels present in the lake and river water used by power plants.

The key to using UV light to control an organism, be it a microorganism or mussel, is that the organism receive an adequate dose of UV light so that it will be unable to survive. The dose of radiation received by an organism is defined by:

$$Dose = Intensity \times Time.$$

wherein Time is the time of exposure of a given organism to the UV light in seconds, Intensity is measured in $W/cm^2$, and Dose is measured in $W \cdot sec/cm^2$. For a given UV lamp power output, the intensity will diminish with increasing radial distance from the lamp.

One example of using UV light to control an organism is the wastewater disinfection system described in U.S. Pat. No. 5,019,256 ("the '256 Patent") which issued on May 28, 1991 and is assigned to an assignee who is related to the assignee of the present invention. The system has a frame on which are mounted one or more modular racks. Each rack has an array of two or more lamp units. Each lamp unit consists of a UV lamp surrounded by a quartz sleeve. Each lamp has contacts for connection to a source of electrical power only at one end of the lamp and the quartz sleeve is closed at one end.

The lamp units are assembled so that the closed end of the quartz sleeve is at end of the lamp not having the electrical power connection contacts. Each rack has two opposed legs. One of the legs has two or more swivel sleeves mounted thereon. Each swivel sleeve is associated with a respective one of the lamp units. The lamp units are mounted on the rack so that the closed end of the quartz sleeve slides into the swivel sleeve. A portion of the closed end of the quartz sleeve resides in the swivel sleeve.

In a UV system such as that described '256 Patent, the intensity is at a minimum at point 2 in FIG. 7c. If an organism remains near the centerline when it passes through the lamp array it will experience a reduced UV dosage as compared to the UV dosage received by an organism that travels an irregular turbulent path through the lamp array. The turbulent pathline will bring the organism closer to the quartz sleeves and therefore closer to the lamps.

Therefore, it is desirable to increase the turbulent mixing already existent in the system as the organism traverses the lamp array. Since the cost of the quartz sleeve is related to its length, it is also desirable to increase the turbulent mixing in the system in a manner that reduces the length of the quartz sleeve. It is further desirable to ensure that there is turbulent mixing throughout the UV system lamp array as the organism traverses the system.

SUMMARY OF THE INVENTION

A method for increasing turbulent mixing in a UV system that is to be immersed in a liquid. The system has at least one lamp unit. The method includes the step of installing a ring-shaped device at a predetermined location on the exterior surface of the lamp unit.

A UV system for immersion in a liquid. The system has at least one lamp unit. The system also has a ring-shaped device located at a first predetermined position on the exterior surface of the lamp unit.

A UV system for immersion in a liquid. The system has a UV lamp unit mounted between upstream and downstream end retainers. The system also has a ring-shaped device mounted on the upstream end retainer adjacent the lamp unit.

DESCRIPTION OF THE DRAWING

FIG. 6b shows a cross sectional view of the channel of FIG. 6a.

DESCRIPTION OF THE PREFERRED EMBODIMENT(S)

Figure 1:
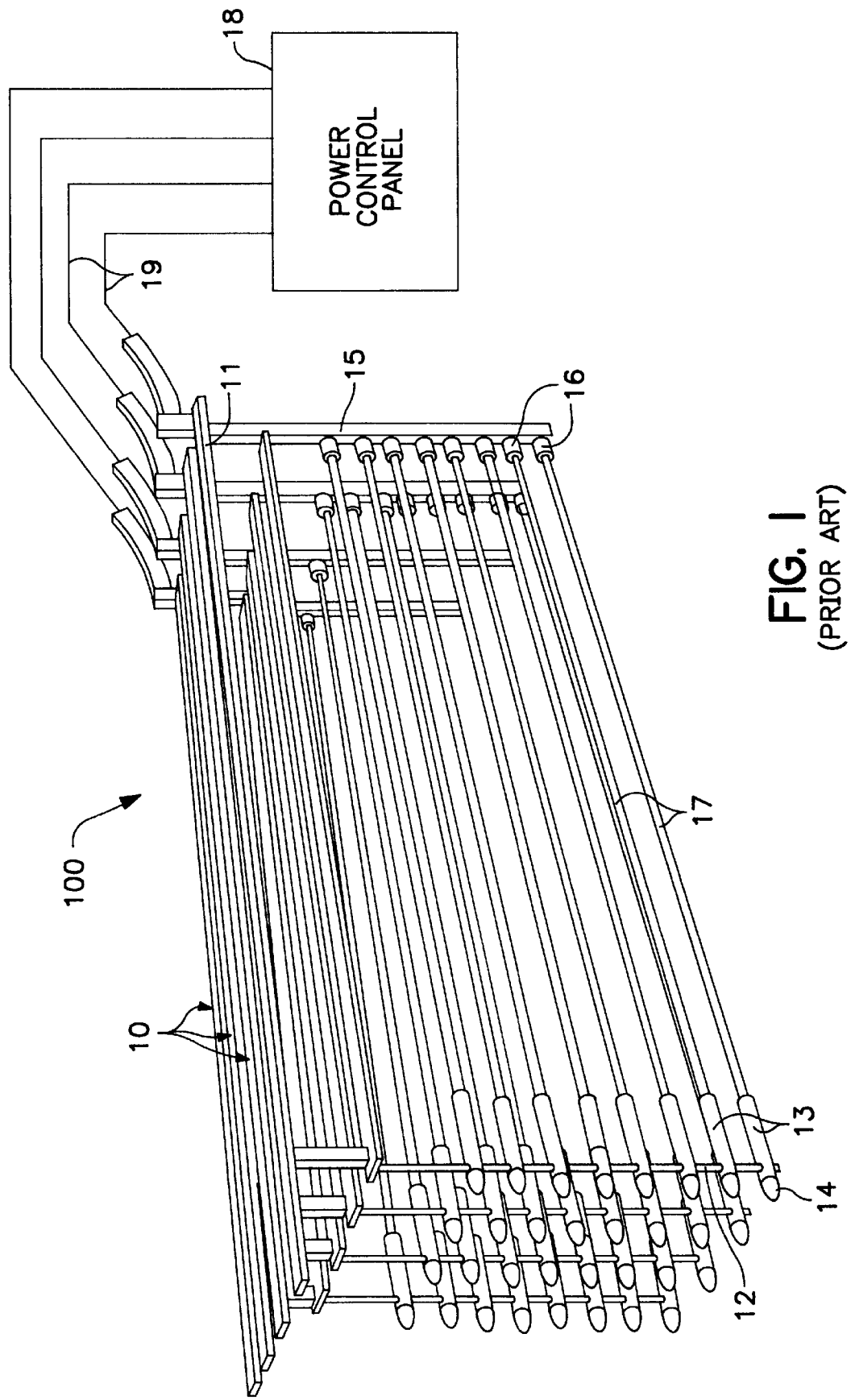
FIG. 1 shows a perspective of the UV system of the '256 Patent.

Referring now to FIG. 1, there is shown a perspective view of the UV system 100 described in the '256 Patent. The system 100 has one or more modular racks 10 each of which have a horizontal hangar bar 11. Depending from bar 11 at an upstream position is a vertical metal rod 12, and depending from bar 11 at a downstream position is a vertical metal conduit 15. Conduit 15 serves as a waterproof passage for electrical cables.

Pivotally mounted on rod 12 at equi-spaced points therealong are metal sleeves 13, each of which has a bullet shaped cap therein. Each of the sleeves swivels in a horizontal plane. Mounted on conduit 15 in a direction facing sleeves 13 are couplers 16, each housing a lamp socket.

Extending between sleeve 13 and the corresponding coupler 16 is a lamp unit 17. The upstream end of each lamp unit is slidably received in the associated sleeve and the downstream end is received in the associated coupler in a manner well known in the art.

Each lamp unit 17 comprises of an elongated tubular UV lamp. Each lamp is protectively housed in a quartz sleeve which is transparent to the UV radiation of the lamp. The upstream end of the quartz sleeve is closed. The open downstream end of the sleeve is received in coupler 16 in a manner so as to seal the open end. The electrical cables in conduit 15 pass through coupler 16 to thereby connect to each lamp at the open end of the associated sleeve.

Figure 2:
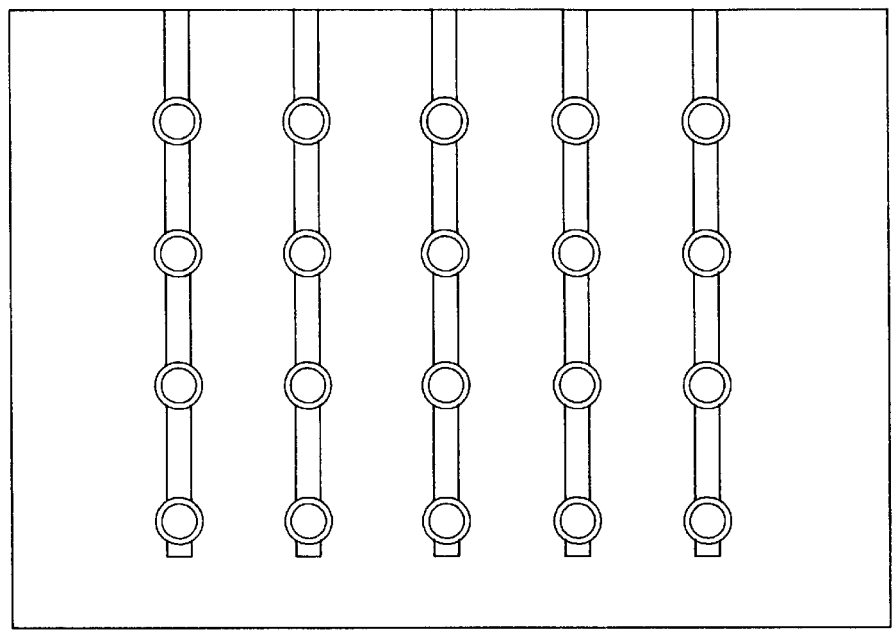
FIG. 2 shows an upstream end view of a flow channel in which a UV system having five racks is immersed.
Figure 3:
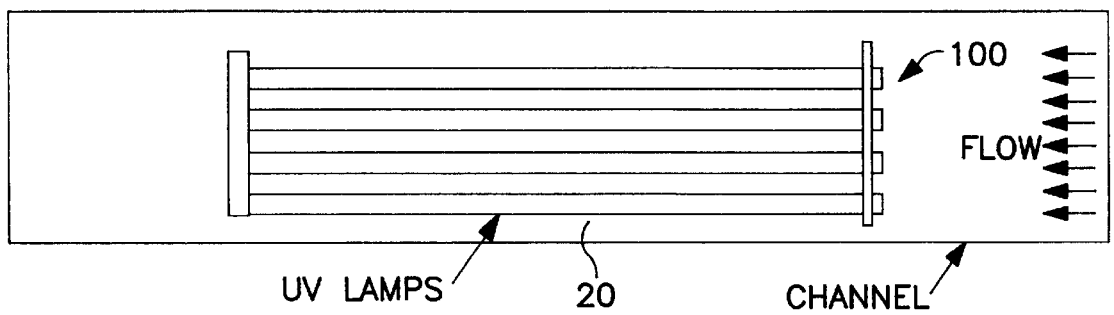
FIG. 3 shows a sectional side view of the channel shown in FIG. 2.

Referring now to FIG. 2, there is shown an upstream end view of a flow channel in which a system 100 having five racks 10 is immersed. Each rack has four lamp units extending between the associated one of sleeves 13 mounted on rod 12 and the associated downstream end coupler (not shown). FIG. 3 shows a sectional side view of the flow channel 20 with system 100 of FIG. 2 immersed therein.

Figure 4:
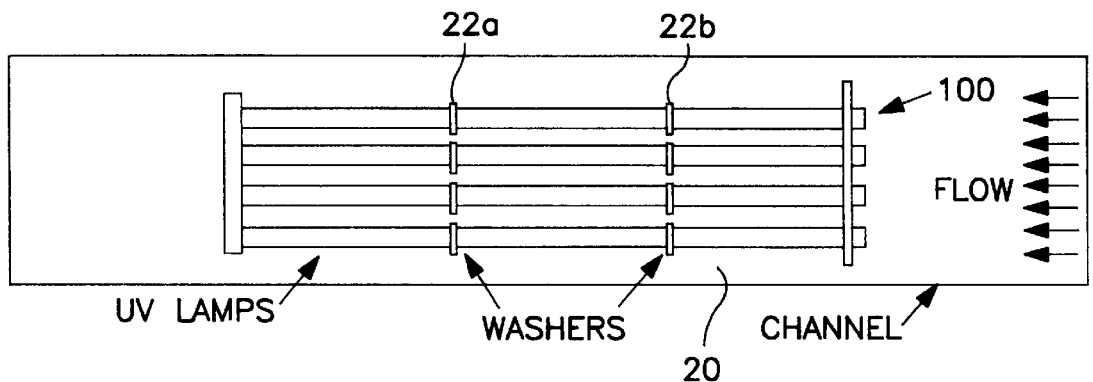
FIG. 4 shows a sectional side of the channel of FIG. 2 with a UV system embodied in accordance with one embodiment of the present invention immersed therein.

In order to increase the turbulent mixing of each rack 10 in system 100, ring-shaped devices, such as washers, were installed over the quartz sleeve in each lamp unit. In one embodiment, two washers of the same size were installed over each quartz sleeve. FIG. 4 shows a sectional side view of the flow channel 20 with the system 100 immersed therein and the two washers 22a and 22b installed on the quartz sleeve of each lamp unit in the rack.

One washer was installed at a point that is one-third of the distance from the upstream end of the rack to the downstream end. The other washer was installed at a point that is two-thirds of the distance from the upstream end to the downstream end. Each of the washers were held in place by a rubber ring (not shown) located right behind the washer. The washers may also be held in place by other means well known to those skilled in the art such as a metal piece which presses against but does not crack the quartz sleeve.

Figure 5:
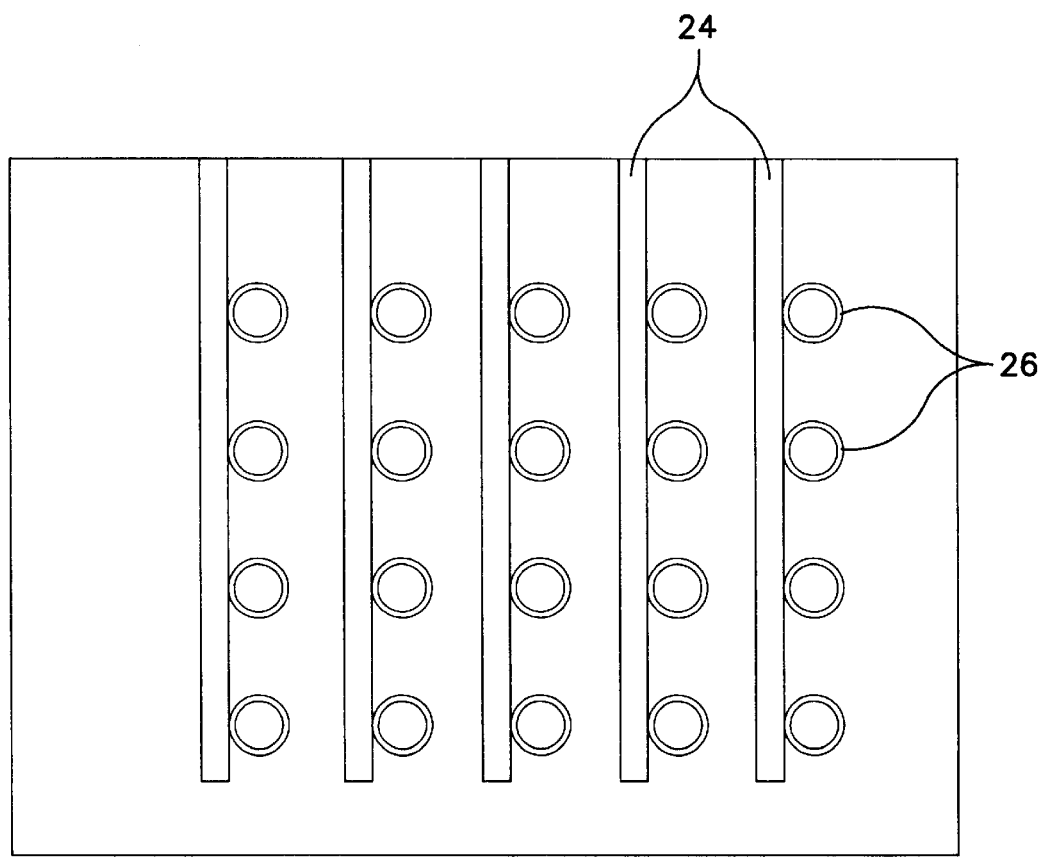
FIG. 5 shows an upstream end of a flow channel with a UV system embodied in accordance with another embodiment of the present invention immersed therein.

Referring now to FIG. 5, there is shown an upstream end view of a flow channel in which there is immersed another embodiment for each of the five racks in system 100. In this embodiment, turbulent mixing is increased by rod 24 and rings 26 which replace rod 12 and metal sleeves 13 of the upstream end of the system described in the '256 Patent. The rings 26 were welded onto rod 24. The rings 26 hold the upstream end of each lamp unit.

Whereas each rack of the system described in the '256 patent employs quartz sleeves that are 1.61 m in length, each rack of the system of FIG. 5 employs quartz sleeves that are only 1.56 m in length. Therefore, not only does the system of FIG. 5 increase turbulent mixing it also results in a reduction of the length of, and thus the cost of, the quartz sleeve.

A further embodiment (not shown) for each of the five racks in system 100 increases turbulent mixing by combining the washers 22a, 22b of the embodiment shown in FIG. 4 with the rod 24 and rings 26 of the embodiment shown in FIG. 5.

The embodiments shown in FIGS. 4 and 5 and the embodiment which is the combination of those embodiments were each tested to determine the increase in turbulent mixing. The tests were performed by immersing each embodiment in a channel that measures 38.89 cm in width, 46 cm in depth and has an approximate length of 12 m. A neutrally buoyant red dye was injected into the flow so that video recordings could be made of the turbulent mixing and flow patterns. As is known to those skilled in the art, a neutrally buoyant dye is a dye that is at the same temperature as the water in the channel.

Figure 6A:
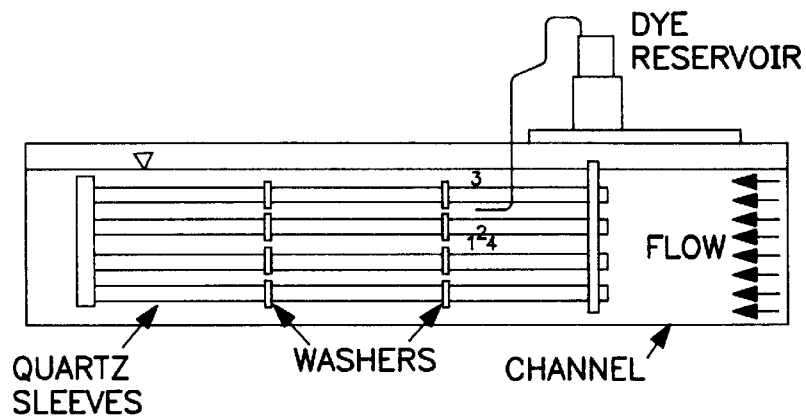
FIG. 6a shows a sectional side view of the channel used to test the present invention and the transverse locations where a neutrally buoyant dye was injected into the channel.
Figure 6B:
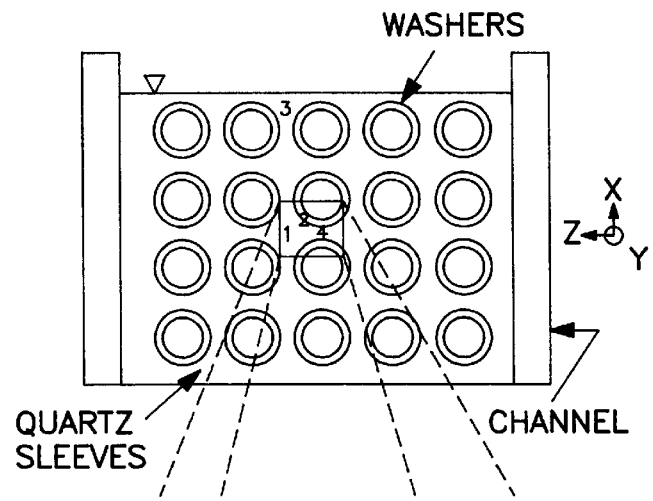
Figure 6C:
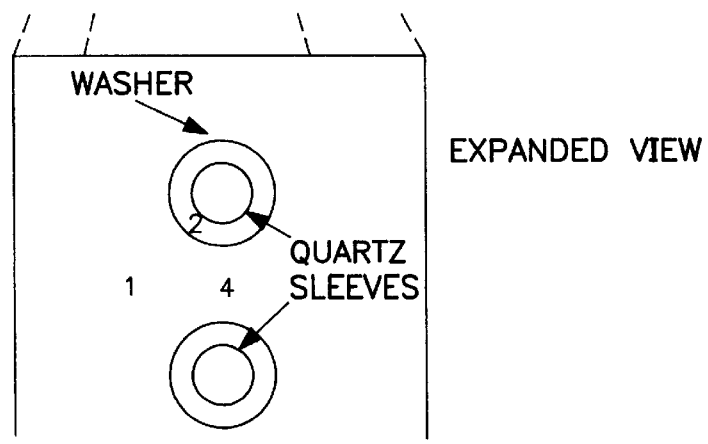
FIG. 6c shows a close up view of three of the dye injection points.

The red dye was injected into the channel at selected spots. FIG. 6a shows a side view of the channel and the four transverse positions 1–4 where the dye was injected. The axial location of the dye injection point was fixed at 5 cm upstream of each set of washers. FIG. 6b shows a cross sectional view of the channel and the dye injection points and FIG. 6c shows a close up view of dye injection points 1, 2 & 4.

In conjunction with the red dye described above, velocity measurements were also conducted on the racks. An acoustic doppler velocimeter (ADV) made by Sontek was used for these measurements. The ADV was held in place by a modified equatorial telescope mount. Since changes in water temperature produce corresponding changes in the speed of sound in water the temperature of the channel water was monitored using a mercury thermometer or other appropriate instrument.

Figure 7A:
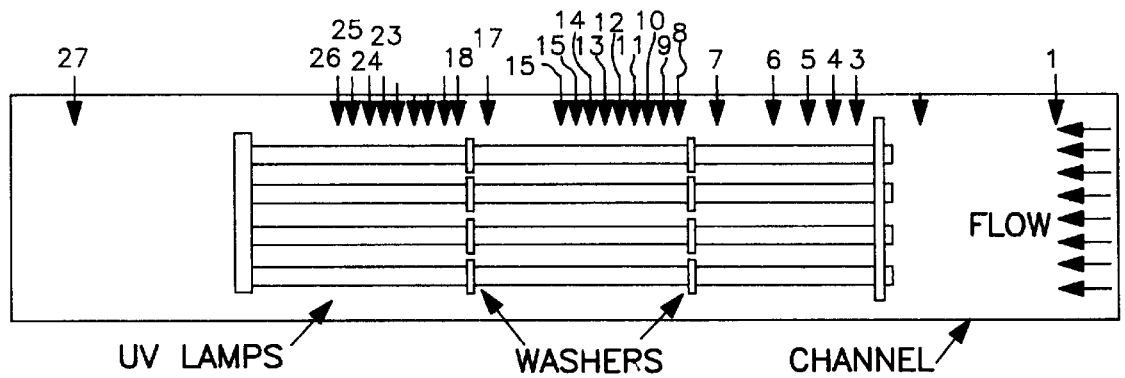
FIG. 7a shows a sectional side view of the channel used to test the embodiment of FIG. 4 and the axial locations where velocity measurements were made.

For the embodiment shown in FIG. 4, velocity measurements were sampled at the 27 axial locations identified by the numbers 1–27 shown in FIG. 7a. Twenty-four of the 27 axial locations are within the rack. For the embodiment shown in FIG. 5, velocity measurements were sampled at the twelve locations identified by the numbers 1–12 in FIG. 7b. Nine of the 12 axial locations are within the rack.

Figure 7B:
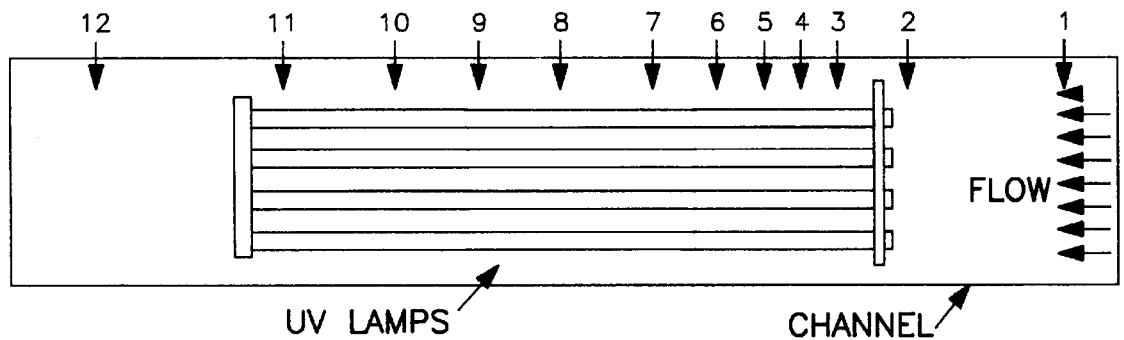
FIG. 7b shows a sectional side view of the channel used to test the embodiment of FIG. 5 and the axial locations where velocity measurements were made.
Figure 7C:
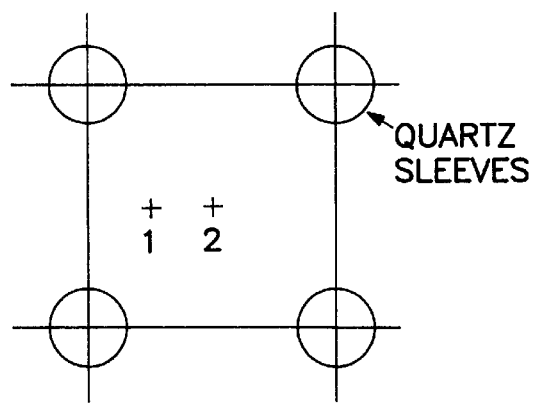
FIG. 7c shows the two transverse positions where velocity measurements were acquired for each axial location shown in FIGS. 7a and 7b.

At each axial location shown in FIGS. 7a and 7b the velocity measurements were acquired at the two transverse positions identified as 1 and 2 in FIG. 7c. Position 1 is midway between the centerline of adjacent vertical and horizontal lamps and position 2, where the UV intensity is at a minimum, is equidistant from the four quartz sleeves.

The testing showed that while the mixing at the upstream end of a rack with washers embodied as is shown in FIG. 4 is either equal to or slightly reduced as compared to a system with racks embodied as shown in the '256 Patent, there is a clear increase in mixing throughout the rest of the system. The testing also showed that the racks with washers embodied as is shown in FIG. 4 had increased average turbulence intensity values as compared to a system with racks embodied as shown in the '256 Patent. The testing further showed that the average turbulence intensity values increased as the washer size increased. The testing also further showed that the racks embodied as is shown in FIG. 5 also had increased average turbulence intensity values as compared to a system with racks embodied as shown in the '256 Patent.

The results described above for a system with racks embodied as shown in FIG. 4 are for that system wherein all of the washers in a system have the same diameter. That system was tested with all of the washers having one of five different washer diameters to account for differing flow velocities. Those washer diameters were 3.81 cm, 4.13 cm, 4.45 cm, 4.76 cm and 5.08 cm.

A system having racks embodied as shown in FIG. 4 was also tested wherein each rack had two washers of different diameters installed on the quartz sleeve of each lamp unit. One washer of 5.08 cm diameter was positioned one third the length of the rack downstream from the upstream entrance adjacent to rod 12. Another washer of 3.81 cm diameter was positioned two-thirds of the length of the rack downstream from the upstream entrance. That system also showed an increased average turbulence intensity values as compared to a system with racks embodied as shown in the '256 Patent.

The testing showed a slight decrease in residence time for those systems having racks embodied using the present invention as compared to the residence time in a system having racks embodied as shown in the '256 Patent. The increase in turbulence in all of the systems having racks embodied in accordance with the present invention is, however, quite large in comparison to the small decrease in residence time.

While the present invention has been described in connection with the system shown in the '256 Patent and the multiple racks having multiple lamp units described therein, it should be appreciated that turbulent mixing can be increased in a system consisting of a single lamp unit by using the rings of the present invention. It should further be appreciated that while the present invention has been described by an embodiment that has shown two rings mounted on each lamp unit and another embodiment which shows a single ring mounted on the upstream rod of the rack which holds the lamp unit, turbulent mixing may be increased by a single ring located either at the upstream or downstream of a lamp unit.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for increasing turbulent mixing in a UV system immersed in a liquid, said system having a plurality of substantially parallel lamp units, said method comprising the steps of:

installing a ring-shaped device at a predetermined location on the exterior surface of each said lamp unit; and flowing the liquid substantially parallel to the plurality of lamp units to cause the ring-shaped devices to provide turbulence in an area between the plurality of lamp units.

2. The method of claim 1 further comprising the step of installing another ring-shaped device at another predetermined location on each said lamp unit exterior surface.

3. A UV system for immersion in a liquid comprising:

(a) a plurality of UV lamp units; and (b) a ring-shaped device located at a first predetermined position on an exterior surface of each said lamp unit, for causing turbulence in liquid flowing in a space between the plurality of lamp units.

4. The UV system of claim 3 further comprising another ring-shaped device located at a second predetermined position on each said lamp unit exterior surface.

5. The system of claim 4 wherein said ring-shaped devices have the same diameter.

6. The system of claim 4 wherein said ring-shaped devices have different diameters.

7. The UV system of claim 3 further comprising at least one rack, said plurality of UV lamp units being mounted on said rack.

8. The UV system of claim 7 wherein said plurality of lamp units are retained by said rack at upstream and downstream ends thereof.

9. The UV system of claim 8 wherein a ring-shaped device is mounted on said rack upstream end adjacent to said lamp units.

10. The UV system of claim 9 wherein the end each said lamp unit adjacent said upstream retainer is received in said ring-shaped device mounted on said rack upstream end.

11. A UV system for immersion in a liquid comprising:

(a) a plurality of UV lamp units mounted between upstream and downstream end retainers;

(b) a ring-shaped device mounted on said upstream end retainer adjacent each said lamp unit, to cause turbulent flow in an area between the plurality of lamp units.

12. The UV system of claim 11 wherein an end of each said lamp unit adjacent said upstream retainer is received in said ring-shaped device.

13. The UV system of claim 11 further comprising a ring-shaped device located on each said lamp unit at a first predetermined location from said upstream end retainer.

14. The system of claim 13 further comprising another ring-shaped device located at a second predetermined position on said lamp unit exterior surface.

15. The system of claim 14 wherein said ring-shaped devices located on each said lamp unit have the same diameter.

16. The system of claim 14 wherein said ring-shaped devices located on each said lamp unit have different diameters.

* * * * *